United States Patent
Warner et al.

(10) Patent No.: US 10,117,043 B2
(45) Date of Patent: Oct. 30, 2018

(54) SERIALLY-CONNECTED BLUETOOTH LOW ENERGY NODES

(71) Applicant: SYMBOL TECHNOLOGIES, INC., Schaumburg, IL (US)

(72) Inventors: Thomas E Warner, Moraga, CA (US); Edward W Geiger, San Martin, CA (US); Chinh Q Phan, Fremont, CA (US); Patrick J Wallace, San Jose, CA (US); Harold H Webber, Lafayette, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/492,148

(22) Filed: Sep. 22, 2014

(65) Prior Publication Data

US 2016/0088421 A1    Mar. 24, 2016

(51) Int. Cl.
*H04B 7/00* (2006.01)
*H04W 4/00* (2018.01)
*H04B 3/54* (2006.01)
*H04W 4/80* (2018.01)
*H04W 4/02* (2018.01)

(52) U.S. Cl.
CPC ............ *H04W 4/008* (2013.01); *H04B 3/548* (2013.01); *H04W 4/80* (2018.02); *H04B 2203/547* (2013.01); *H04B 2203/5441* (2013.01); *H04W 4/02* (2013.01)

(58) Field of Classification Search
None
See application file for complete search history.

(56) References Cited

U.S. PATENT DOCUMENTS

| | | |
|---|---|---|
| 5,117,236 A | 5/1992 | Chang et al. |
| 5,533,011 A | 7/1996 | Dean et al. |
| 6,735,524 B1 | 5/2004 | Challoner et al. |
| 6,850,502 B1 | 2/2005 | Kagan et al. |
| 6,885,847 B1 | 4/2005 | Lumelsky |
| 7,026,936 B2 | 4/2006 | Roesner |

(Continued)

FOREIGN PATENT DOCUMENTS

| | | |
|---|---|---|
| CA | 2485097 A1 | 11/2003 |
| EP | 2544302 A1 | 9/2013 |

(Continued)

OTHER PUBLICATIONS

International Search Report and Written Opinion dated Dec. 2, 2015 in counterpart PCT application PCT/US2015/050403.

(Continued)

*Primary Examiner* — Tuan A Tran

(57) ABSTRACT

Bluetooth Low Energy nodes are serially-connected with a cable that includes power lines and can include communication wires. The nodes do not have individual batteries. Instead, a single common power source is connected to the wires to provide power for all the nodes. The nodes can also be connected in series with the communication wires (which can be the same as the power wires) along a length of the cable. A headend interface can also be connected at one point of the cable to provide a communication interface with the nodes. The nodes can transmit and/or receive beacons to be used for locationing of mobile devices.

13 Claims, 4 Drawing Sheets

(56) References Cited

U.S. PATENT DOCUMENTS

| | | | |
|---|---|---|---|
| 7,257,099 B2 * | 8/2007 | Myojo | H04J 3/0685 370/329 |
| 7,423,999 B2 * | 9/2008 | Tailor | H04W 88/02 370/328 |
| 7,439,909 B2 | 10/2008 | Van Toorenburg | |
| 7,453,363 B2 | 11/2008 | Reynolds | |
| 7,493,081 B2 * | 2/2009 | Burdick | H04B 7/18597 370/316 |
| 7,499,717 B2 * | 3/2009 | Arazi | H04M 1/725 370/350 |
| 7,613,425 B2 * | 11/2009 | Tailor | H04W 88/04 370/328 |
| 7,623,828 B2 * | 11/2009 | Block | H04W 74/06 370/328 |
| 7,636,549 B2 * | 12/2009 | Ma | G06F 19/327 455/41.2 |
| 7,783,270 B1 * | 8/2010 | Haab | H04B 1/1607 343/890 |
| 7,792,640 B2 | 9/2010 | Swope et al. | |
| 7,913,121 B2 * | 3/2011 | Lou | G01R 31/31705 714/25 |
| 8,126,040 B2 | 2/2012 | Liu et al. | |
| 8,159,399 B2 | 4/2012 | Dorsey et al. | |
| 8,199,004 B1 | 6/2012 | Crooks | |
| 8,320,932 B2 | 11/2012 | Pinder et al. | |
| 8,351,546 B2 | 1/2013 | Vitek | |
| 8,358,967 B1 | 1/2013 | Rebolledo et al. | |
| 8,396,483 B2 | 3/2013 | Chater-Lea et al. | |
| 8,676,227 B2 * | 3/2014 | Chueh | H04L 67/1095 455/404.2 |
| 8,849,191 B2 * | 9/2014 | Gavrilovich | H04B 7/1555 375/295 |
| 9,065,497 B2 | 6/2015 | Swope et al. | |
| 2005/0070227 A1 * | 3/2005 | Shen | H04B 1/44 455/41.3 |
| 2006/0152410 A1 | 7/2006 | Shi | |
| 2006/0238307 A1 | 10/2006 | Bauer et al. | |
| 2006/0253693 A1 * | 11/2006 | Kanodia | G06F 8/61 713/1 |
| 2006/0276227 A1 | 12/2006 | Dravida | |
| 2007/0057843 A1 | 3/2007 | Chang et al. | |
| 2010/0330940 A1 | 12/2010 | Sheynblat et al. | |
| 2011/0025468 A1 | 2/2011 | Longhurst et al. | |
| 2011/0070840 A1 | 3/2011 | Nielsen et al. | |
| 2011/0274183 A1 | 11/2011 | Wang | |
| 2012/0056784 A1 | 3/2012 | Xie et al. | |
| 2012/0139810 A1 | 6/2012 | Faraone et al. | |
| 2012/0169539 A1 | 7/2012 | Huang et al. | |
| 2012/0214417 A1 | 8/2012 | Woo et al. | |
| 2013/0040655 A1 | 2/2013 | Keidar | |
| 2013/0095875 A1 | 4/2013 | Reuven | |
| 2013/0101005 A1 | 4/2013 | Aryanfar | |
| 2013/0235962 A1 | 9/2013 | O'Keefe et al. | |
| 2014/0055243 A1 | 2/2014 | Kerai | |
| 2014/0157135 A1 | 6/2014 | Lee et al. | |
| 2014/0226741 A1 | 8/2014 | Harel et al. | |
| 2014/0372185 A1 * | 12/2014 | Ganot | G07B 15/02 705/13 |
| 2015/0016554 A1 | 1/2015 | Swope et al. | |
| 2015/0016555 A1 | 1/2015 | Swope et al. | |

FOREIGN PATENT DOCUMENTS

| | | |
|---|---|---|
| EP | 2672632 | 12/2013 |
| GB | 2480485 A | 5/2010 |
| WO | 2005015755 A2 | 2/2005 |
| WO | 2008127750 A2 | 10/2008 |
| WO | 2013028171 A1 | 2/2013 |

OTHER PUBLICATIONS

International Search Report and Written Opinion for International Patent Application No. PCT/US2014/044022 dated Sep. 16, 2014.
International Preliminary Report on Patentability for International Patent Application No. PCT/US2014/044018 dated Jan. 12, 2016.
Office Action for German Patent Application No. 112015004293.8 dated Feb. 19, 2018.

* cited by examiner

SERIALLY-CONNECTED BLUETOOTH LOW ENERGY NODES

BACKGROUND

Bluetooth Low Energy (BLE) nodes are becoming an industry wide phenomenon for applications including locationing and asset tracking. For example, BLE nodes at mapped locations can transmit BLE beacons as part of an overall locationing system, which can be used for detecting a mobile device's presence, its zone, or its actual position. For example, if a mobile device detects a certain node's beacon at a certain location, then it can be assumed that the mobile device is also at that certain location. BLE nodes that are currently on the market are battery operated devices which transmit periodic beacons. These nodes use Over-The-Air (OTA) programming techniques from a wireless server to set parameters such as blink rates (i.e. the rate at which beacons are sent) and transmit power levels. However, the node firmware is loaded into the node during the manufacturing process and not expected to be changed once it is release to the field.

Battery operated BLE nodes, such as those used for only transmitting beacons, have a number of limitations including battery life and node management. In general, the use of batteries creates numerous operational issues. Batteries, of course, add cost to the product, and must be replaced over time. Also, battery management must be implemented to alert the customer to service the nodes when the batteries are near their end-of-life to prevent system downtime. In some applications, where highly accurate locationing is required, thousands of batteries can be deployed in a single store, creating a logistical nightmare servicing nodes and disposing of batteries. Adding battery replacement capability to the node also increases its mechanical complexity and cost.

For BLE nodes the lifetime of the batteries is most directly related to the (beacon) chirp rate, but for most locationing algorithms higher chirp rates are desirable. Today chirp rates of ten per second are the standard, but even faster rates may be necessary. Market studies show that a one year lifetime is a minimally acceptable battery life for customers. However, at a ten per second chirp rate a standard CR2450, 620 maH battery will lose its charge in about four months. Therefore, longer battery lifetimes are highly desirable.

Regarding node management, because BLE nodes are 100% wireless, node management must be done Over-The-Air (OTA). Node provisioning includes setting chirp rate and power level and is done OTA—one node at a time, usually at installation. If it is determined during operation that the original settings are not correct or need to be optimized, each tag, one at a time, needs to be reprogrammed. For a store with thousands of tags this will be very time consuming and may be a barrier to market acceptability by customers. Another, even worse scenario, would be the need to re-download the software to the tag. This could happen due to a bug discovered after installation or for a feature enhancement. Downloading a typical software image may take up to twenty seconds per node, and since the BLE node is in a connect state during this time, can drain away a significant portion of the battery life.

Accordingly, there is a need for a BLE node that can be manufactured and utilized in a way that overcomes the aforementioned limitations. It would be beneficial to provide this overhead system in an easily installed arrangement that can be provided and reconfigured at a low cost.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
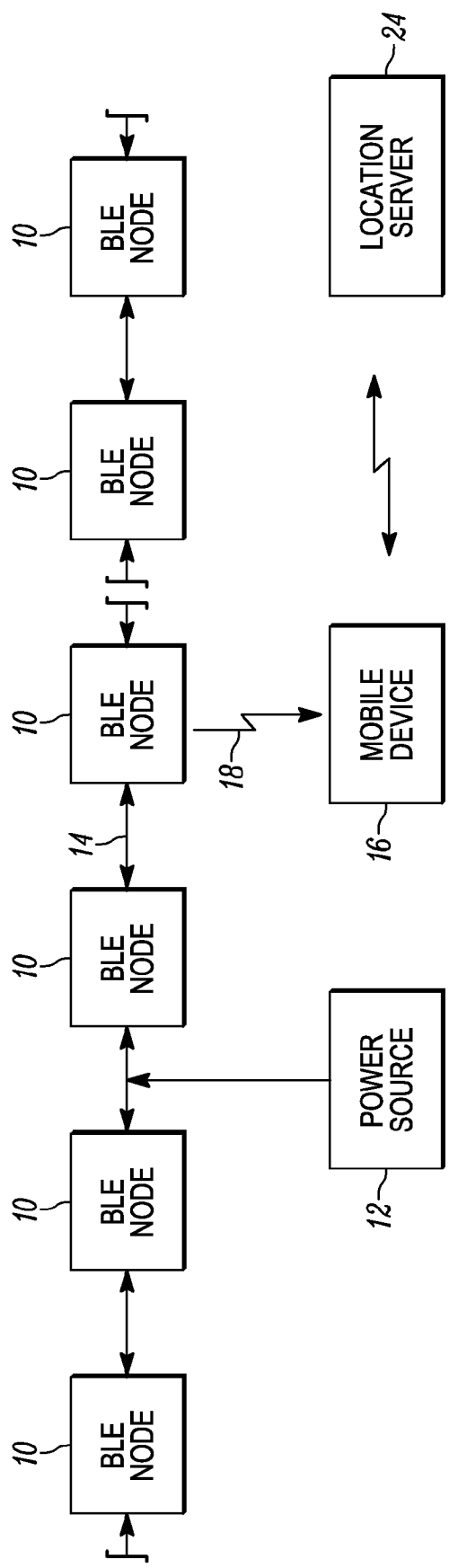
FIG. 1 is a simplified block diagram of a BLE node apparatus, in accordance with one embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides an improved Bluetooth Low Energy (BLE) node deployment with the ability to improve node management and mitigate battery life issues with a low installation cost. In particular, the present invention serially-connects a set of low-cost consumer-grade BLE nodes along wires in a single cable. The cable can carry both power and communications connectivity for all the serially-connected BLE nodes along the cable. As a result, simply stringing the cable within an establishment will provide not only a low-cost BLE node network, but also a locationing network with minimal installation cost. It is envisioned that the present invention can be deployed in numerous different environments includes a retail store, warehouse, hospitality areas, businesses, etc. environments including retail stores, warehouses, hotels, businesses, etc.

Advantageously, the present invention avoids the need to change batteries in individual BLE nodes and simplifies any reconfiguring of BLE nodes in the field. In addition, the present invention takes advantage of the fact that BLE nodes can also receive signals. The present invention creates a complete tracking and asset management system. In prior art BLE nodes, the receive functionality is only used for OTA provisioning and software upgrades. During normal operation the node is in a deep sleep, battery saving mode until it needs to beacon. However, in the present invention the BLE node also functions, when not beaconing, as a full-time receiver. Given a communications path back to a locationing server, the present invention also acts as an asset tracking system by receiving BLE beacons from assets, e.g. shopping carts, luggage carts, employees with BLE devices, etc. Where the BLE nodes are deployed in known, fixed locations any node that receives a beacon from an asset can relay this information to the locationing server along with its identification, thereby associating a location of the asset with the known BLE node location.

FIG. 1 is a block diagram of one embodiment of serially-connected Bluetooth Low Energy nodes 10. A cable 14 includes two continuous direct current power wires. A plurality of battery-less Bluetooth Low Energy nodes 10 are connected in series with the power wires along a length of the cable. For example, the nodes can be deployed as strings of up to 64 nodes over 100 meters of two-conductor cable. It is envisioned that the nodes can be connected to the two power wires using known insulation displacement connection techniques where the node power connection can simply be crimped onto the power wires. The nodes can be placed anywhere along the cable. For example, if one meter locationing accuracy is desired along some distance, nodes can be placed every one meter over that length of cable. If less accuracy is needed in a different area, tags can be spaced further apart or at points of interest. For example, in a hotel hallway it may be desirable to place tags at guest's door, elevators, stairwells, etc.

Because the present invention eliminates any power concern, chirp rates can be set to optimize locationing convergence, increasing the speed with which accurate locationing is achieved. In this embodiment, the nodes can be configured in transmit-only mode, to periodically broadcast identifying beacons 18, where a mobile device 16 moving within the environment will be able to read a beacon 18 from a nearby node and wirelessly report the beacon information to the locationing server, using a cellular communication or local area wireless network. The ability of the nodes to transmit beacons to a mobile device to report to the locationing server opens up locationing services which can be offered to the customer. Any mobile device reporting node beacons can be easily located and tracked by the server since the BLE nodes are deployed in known, fixed location. For example, any mobile device that receives a beacon from a node can relay the node identity information to the locationing server, thereby associating a location of the mobile device with the known BLE node location.

In FIG. 1, a power source 12 is connected at one point along the cable 14 and operable to provide power to the plurality of nodes along the power wires. In this way only one power source powers all the nodes and can be scaled to provide a suitable amount of power to last a desired amount of time. The power source can be located anywhere along the cable. The power source can be a simple DC rechargeable battery pack, an AC/DC conversion transformer that can be plugged into a standard wall outlet, or a Power-over-Ethernet connection.

For example, the power source can be located anywhere along the power wires and simply snapped on the cable to make the power connection, again using an insulation displacement connector. Even with sixty-four tags in receive mode, power draw will be low, so the power source can be very small. Because the individual nodes do not have their own battery they can be made smaller than in the prior art to be extremely small, lightweight, and inconspicuous, and can be easily clamped onto the power wires using insulation displacement techniques. The small gauge of the required wires and the small footprint of the nodes makes installation options simple, numerous and straightforward.

The power source also provides a means to reset the operating state of all nodes on the cable by interrupting the supply of power to all nodes simultaneously. This might be necessary following an electrical disruption such as a lightning strike, a software failure, or to initiate a software upgrade. A system reset might be triggered by a push button on the power source, a message from the headend interface, or when a sufficiently long interval of communications inactivity is observed.

Figure 2:
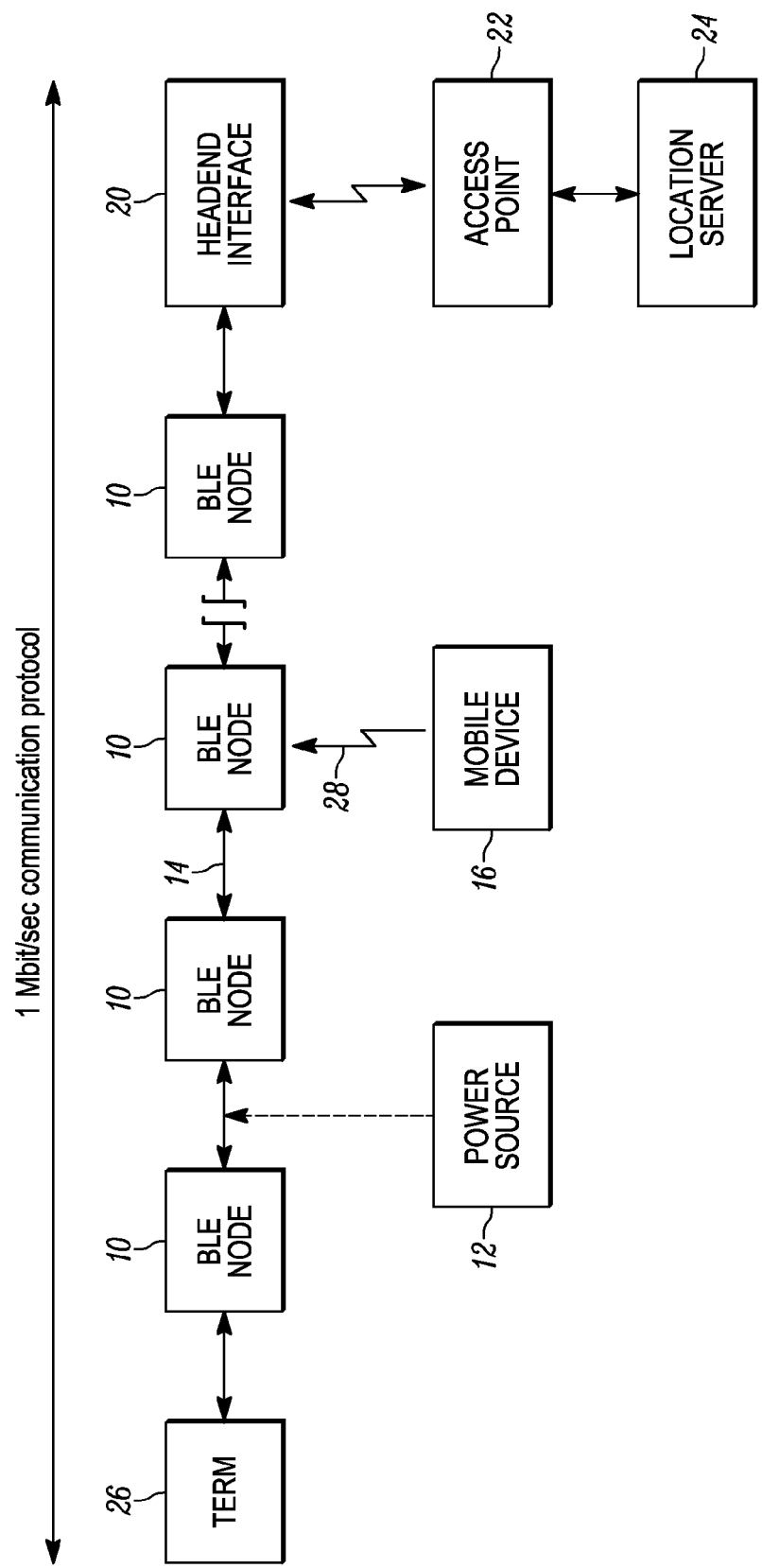
FIG. 2 is a simplified block diagram of a BLE node apparatus, in accordance with another embodiment of the present invention.

FIG. 2 is a block diagram depiction of another embodiment of the present invention. In this embodiment, the cable 14 also includes communication wires for communicating with the plurality of nodes 10. A headend interface 20 couples the communication wires to a remote device, such as a wireless access point 22 connected to a locationing server 24. The headend interface can be clamped onto the cable using insulation displacement techniques. Preferably, the headend interface 20 is connected to one end of the cable 14 and a suitable termination 26 is clamped onto the other end of the cable. In this case, a power source 12 could be provided as before, although the headend interface can include a power distribution module to act as the power source for the nodes. In this case, the power distribution module can include a transformer and a converter to convert standard AC mains power to DC power for the nodes.

The headend interface communicates with a headend device, which does not need to be physically coupled to the cable. The headend device is a controller or processor which is the master node in the communications protocol to the BLE nodes and the interface to the location server via an embedded Wi-Fi client radio or a wired Ethernet interface. The headend device terminates the protocol and passes the information, i.e. location data, provisioning data, etc between the BLE nodes and the location server. The location server is the master controller of the system. The location server may control many of these strings of BLE nodes. The location server could be local to the BLE strings or could be in the cloud.

Although, the power wires and communication wires can be separate (in a four-wire cable), it is envisioned that the power wires and the network communication wires can be the same two wires. In particular, a two-wire cable can support a bi-directional, point-to-multipoint 1 Mb/sec protocol. This protocol will use spectrum above baseband, allowing it to co-exist with the DC power on the same wires. The communication protocol will terminate at the headend interface 20 which will provide an IEEE 802.11 wireless interface to connect the nodes to existing wireless infrastructure (e.g. access point 22) of the building and to the remote server (e.g. locationing server 24).

The wireless infrastructure can comprise local and wide-area networks, or other IEEE 802.11 communication systems. However, it should be recognized that the present invention is also applicable to other wired or wireless communication systems. For example, the description herein can apply to one or more communication networks that are IEEE 802.xx-based, employing technologies such as IEEE's 802.11, 802.16, or 802.20, modified to implement embodiments of the present invention.

Those skilled in the art will recognize that FIG. 2 does not depict all of the equipment necessary for system to operate but only those system components and logical entities particularly relevant to the description of embodiments herein. For example, servers, routers, switches, and access points can all includes separate processors, communication interfaces, transceivers, memories, etc. In general, components such as processors, transceivers, memories, and interfaces are well-known. For example, processing units are known to comprise basic components such as, but not limited to, microprocessors, microcontrollers, memory cache, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations.

Referring back to FIG. 2, each BLE node is assigned its own Media Access Control (MAC) address during manufacture. Accordingly, the headend interface 20 can operate to individually address and communicate with each node 10 along the two wires by digitally modulating signals at a frequency above baseband to allow the nodes to have simultaneous communication and delivery of power. Since the BLE nodes are attached to a physical wire pair (which can be a twisted pair or straight), the nodes can be reconfigured and can get software updates over the wire pair. In addition, since all the nodes are on the same wire, it will also be possible for the headend interface to group address all the nodes at the same time to listen for instructions from the headend interface. In particular, the headend interface can provide instruction to individual or all the nodes on the cable to reconfigure operating parameters of particular addressed nodes. For example, reconfiguring the node operating parameters can include any one or more of: software upgrades, provisioning the node, changing power levels, transmit beacon duty cycle (chirp rate), and transmit/receive mode. All node management functions, including provisioning, software upgrades, and the like, will take place over the headend interface 20 between the nodes and access point 22. The headend interface will communicate with the location server 24 over wireless infrastructure.

The ability to easily upgrade software could add asset tracking and location features, in accordance with the present invention. In particular, the BLE nodes can act as both a BLE beacon system (using the locationing embodiment as in FIG. 1) and a BLE receiving system. For example, the nodes can be configured by the headend interface to perform as a BLE beacon with its provisioned chirp rate and power level as in the battery operated node. However, because the present invention eliminates any power concern, chip rates can be set to optimize locationing convergence, increasing the speed with which accurate locationing is achieved. When not beaconing, the node can be in a receive mode, allowing it to report on the reception of any BLE enabled assets in the area. These received beacons 28 will be reported to the locationing server along with the reporting node identity via the wired headend interface and wireless access point, wherein the reporting node identity is associated with the mobile device location. The ability of the nodes to receive beacons and report these to the locationing server opens up entirely new set of services which can be offered to the customer. Any asset equipped with a beaconing tag can be easily located and tracked. This has numerous applications throughout retail, hospitality, and healthcare services.

Figure 3:
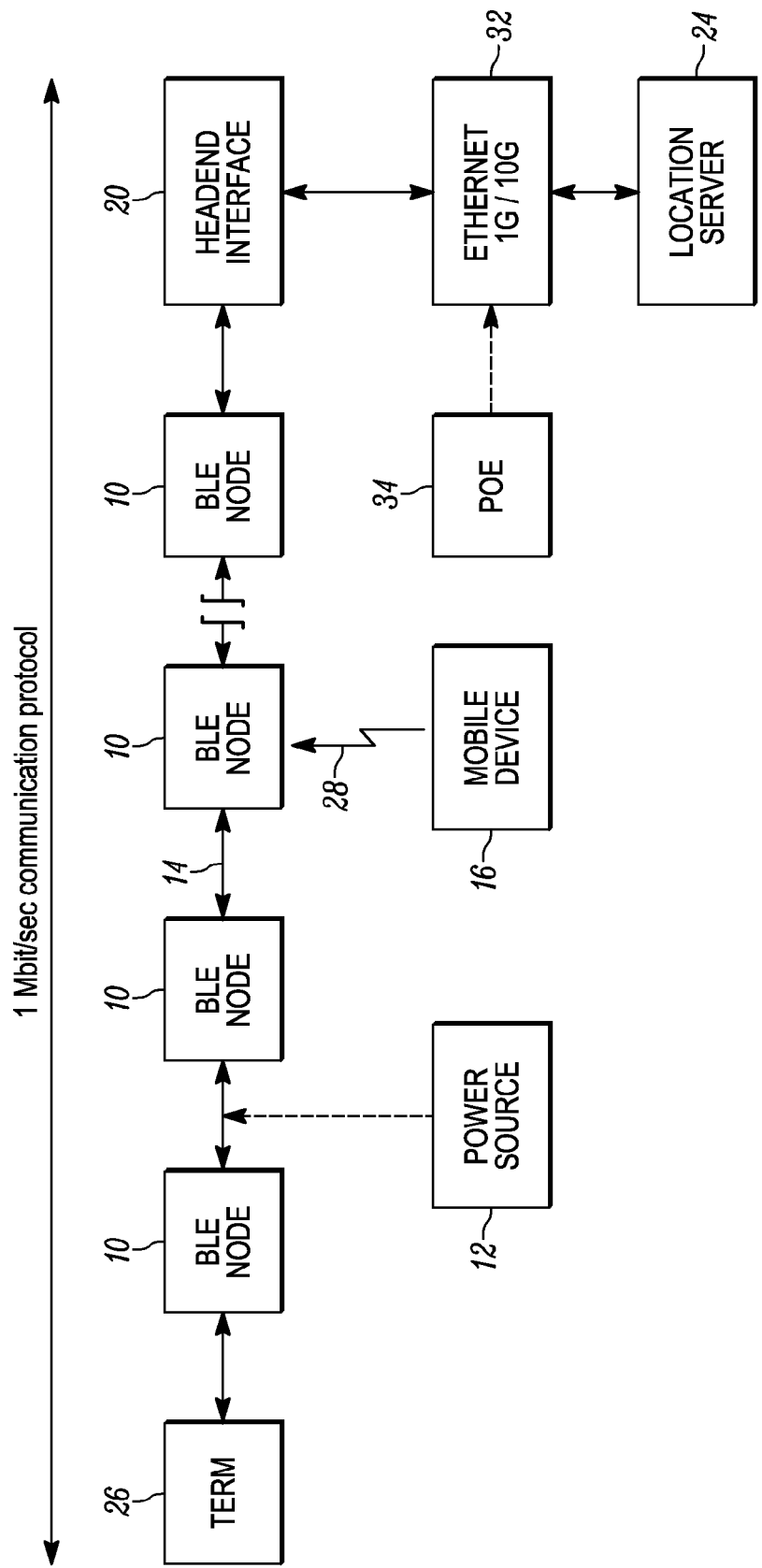
FIG. 3 is a simplified block diagram of a BLE node apparatus, in accordance with yet another embodiment of the present invention.

FIG. 3 is a block diagram depiction of yet another embodiment of the present invention. In this embodiment, the cable 14 also includes communication wires for communicating with the plurality of nodes 10. The headend interface 20 terminates the communication protocol running on the BLE node side of the headend and interfaces to a remote Ethernet device 32 with an Ethernet connection to the locationing server 24. The headend interface can be clamped onto the cable using insulation displacement techniques. Preferably, the headend interface 20 is connected to one end of the cable 14 and a suitable termination 26 is clamped onto the other end of the cable. In this case, a power source 12 could be provided as before, although the headend interface can be supplied with a Power-over-Ethernet (PoE) connection 34 to act as the power source for the nodes. In this case, the headend interface 20 can supplies both power and a standard interface to a wired Ethernet device 32, which can include Ethernet 10G or multiple 1G connections, for example. A headend processor, such as a field programmable gate array, provides a 10G or 1G physical layer interface for the Ethernet connection. In this example, the PoE interface will act as the communication backbone into the buildings network infrastructure as well as providing power to the system. The headend interface, power distribution module, and Ethernet connections could be provided in a single physical module or in discreet modules.

As before, the BLE nodes can act as both a BLE beacon system and a BLE receiving system. For example, the nodes can be configured by the headend interface to perform as a BLE beacon (as shown in FIG. 1) with its provisioned chirp rate and power level as in the battery operated node. However, because the present invention eliminates any power concern, chip rates can be set to optimize locationing convergence, increasing the speed with which accurate locationing is achieved. When not beaconing, the node can be in receive mode (as shown in FIGS. 2-3), allowing it to report on the reception of any BLE enabled assets in the area. These received beacons will be reported to the locationing server via the wired headend interface and wired Ethernet device. Therefore, the embodiments of FIGS. 2-3 can operate as in FIG. 1 when in transmit mode and as shown in FIGS. 2-3 when in receive mode.

Installing the system would be quite easy since the cable could be simply strung in a building (e.g. in a straight line or weaved throughout a ceiling of the building), where one end of the cable would be attached to the headend interface. The actual arrangement or placement of the cable combined with the number of nodes installed per length determines the locationing accuracy. A cable strung in a straight line would have fewer nodes per given area, while a cable that is woven back and forth would have more nodes per given area. The more cable installed in a given area, the more locationing accuracy is available. It is also envisioned that cables could be coupled in series, as long as a maximum length is not exceeded.

Because the power draw is very low for a string of beacons, the cable type will not need to be influenced by power capability but by mechanical issues and cost. For example, simple lamp cord would be overkill for power requirements, but is cheap, flexible and there are insulation displacement solutions available for this. In another case, a flat four-conductor ribbon cable, which may be useful for stringing under carpeting, etc. will have enough current carrying capacity even at small gauges.

Figure 4:
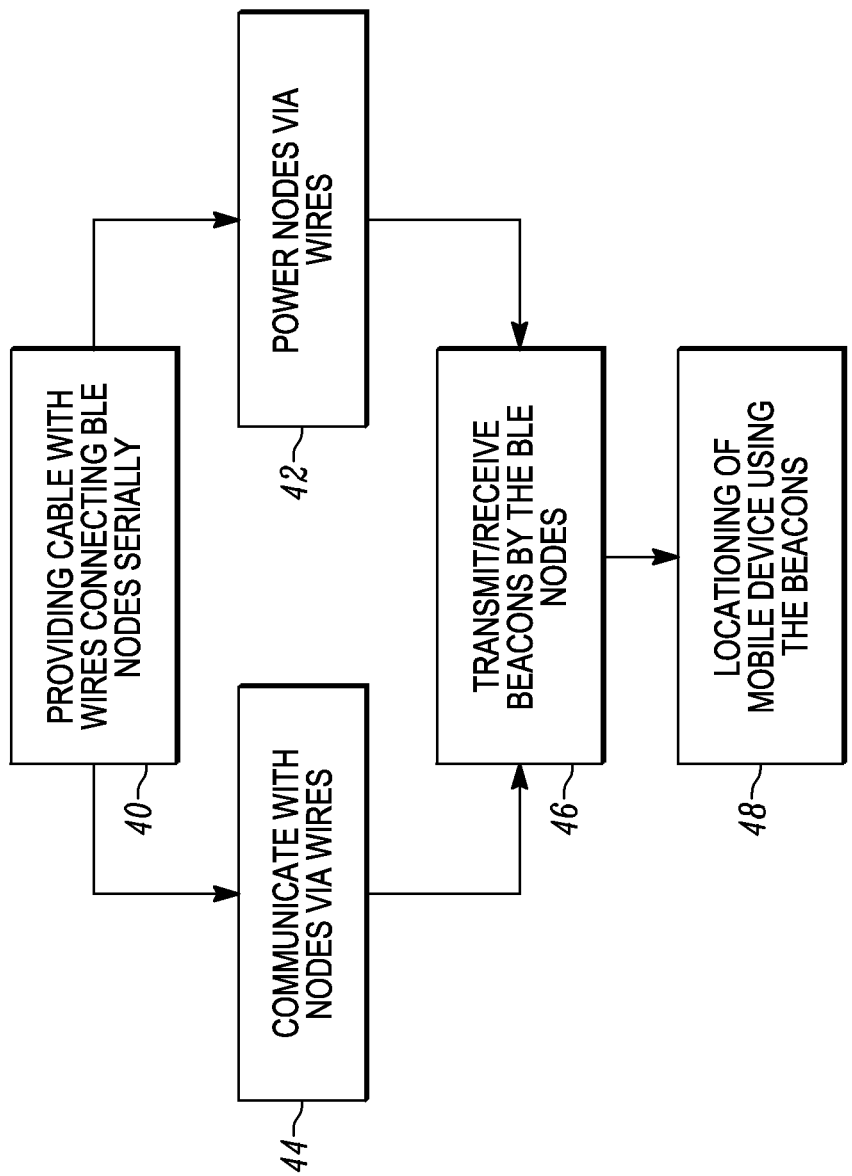
FIG. 4 is a flow chart of a method, in accordance with some embodiments of the present invention.

FIG. 4 shows a flow chart of a method for serially-connected Bluetooth Low Energy nodes, in accordance with the present invention, which includes a first step 40 of providing a cable including two wires, and a plurality of Bluetooth Low Energy nodes connected in series with the wires along a length of the cable, the nodes without individual batteries.

A next step 42 includes powering the plurality of nodes by a power source connected to the wires at one point along the cable.

Another step 44 includes communicating with the plurality of nodes over the wires by a headend interface. This can be done simultaneously with step 42. For example, communicating 44 can include individually or group addressing and communicating with each node along the two wires by digitally modulating signals at a frequency above baseband to allow the nodes to have simultaneous communicating and powering. The actual communication can include reconfiguring operating parameters of addressed nodes.

A next step 46 includes transmitting and/or receiving beacons by the nodes.

A next step 48 includes locationing of a mobile device using the transmitting and/or receiving beacons. For example, the nodes can perform as a BLE beacon in transmit mode (as shown in FIG. 1). When not beaconing, the node can be in receive mode (as shown in FIGS. 2-3). In transmit mode, a mobile device can receive the beacon, including node identity information, from a nearby node, and report this information and its own identity to a locationing server, which will associate a known location of the identified beacon with the identified mobile device. In receive mode, a BLE node can report on the reception of any BLE beacon, including node identity and mobile device identity, from a nearby mobile device. The report can be sent to the locationing server via the wired headend interface and wired Ethernet device, or the wired headend interface and wireless access point, wherein the locationing server will associate a known location of the identified beacon with the identified mobile device.

Advantageously, the present invention can be deployed very simply. The installation can be started by running the cable along the route where locationing or asset tracking is desirable. The tags can be attached along the cable at specific locations where locationing is desired, or at periodic lengths along the cable depending on accuracy desired. Once the cable is powered, the beacons can be provisioned from the location server. Alternatively, the beacons can be pre-installed at specific distances along the cable, or the beacons can be molded into the cable at predetermined distances. In this case, the tags could be enabled based on the desired location accuracy.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for serially-connected Bluetooth Low Energy nodes, the apparatus comprising:
    a cable including power wires;
    a plurality of Bluetooth Low Energy (BLE) nodes connected in series with the power wires along a length of the cable; and
    a power source connected at one point along the cable and operable to continuously provide power to the plurality of BLE nodes along the power wires so that each of the plurality of BLE nodes, when powered by the power source: (a) includes a transmit mode that transmits a first BLE beacon to a mobile device, and (b) when not in the transmit mode, functions in a receive mode by monitoring reception of a second BLE beacon from the mobile device, wherein, in the receive mode, a BLE node that received the second BLE beacon from the mobile device is configured to send a report including a first identification of the mobile device and a second identification of the BLE node to a locationing server via a headend interface connected to the cable, wherein the locationing server is to determine a location of the mobile device based on the received second identification of the BLE node and a known location of the BLE node.

2. The apparatus of claim 1, wherein the cable includes communication wires for communicating with the plurality of BLE nodes, and the headend interface couples the communication wires to a remote device.

3. The apparatus of claim 2, wherein the power wires and the communication wires are the same two wires, and the headend interface is configured to individually address and communicate with each of the BLE nodes along the two wires by digitally modulating signals at a frequency above baseband to allow the respective BLE nodes to have simultaneous communication and delivery of power.

4. The apparatus of claim 2, wherein the headend interface is configured to individually address and communicate with each of the BLE nodes via the communication wires to reconfigure an operating parameter of addressed nodes.

5. The apparatus of claim 4, wherein reconfiguring the operating parameter includes at least one of a software upgrade, provisioning the corresponding one of the BLE nodes, changing power levels, transmit beacon duty cycle, transmit/receive mode.

6. The apparatus of claim 2, wherein the remote device is an Ethernet device and the power source is a Power over Ethernet connection.

7. The apparatus of claim 1, wherein the remote device is an access point, and the headend interface is configured to communicate with the access point wirelessly.

8. The apparatus of claim 1, wherein a simultaneous reset is triggered via one or more of an interface disposed on the power source and a message received from the headend interface.

9. A system for serially-connected Bluetooth Low Energy nodes, the system comprising:
    a remote controller;
    a cable including wires for carrying power and communications;
    a plurality of Bluetooth Low Energy (BLE) nodes connected in series with the wires along a length of the cable, and the nodes configured to use beacons for locationing of a mobile device by the remote controller;
    a power source connected at one point along the cable and configured to continuously provide power to the plurality of BLE nodes along the wires so that each of the plurality of BLE nodes, when powered by the power source: (a) includes a transmit mode that transmits a first BLE beacon to the mobile device to locate the mobile device, and (b) when not in the transmit mode, functions in a receive mode by monitoring reception of a second BLE beacon from the mobile device, wherein, in the receive mode, a BLE node that received the second BLE beacon from the mobile device is configured to send a report including a first identification of the mobile device and a second identification of the BLE node;
    a headend interface coupling the wires to the remote controller, wherein the headend interface is configured to individually address and communicate with each node along the wires by digitally modulating signals at a frequency above baseband to allow the nodes to have simultaneous communication and delivery of power; and
    a locationing server, in communication with the headend interface, to determine a location of the mobile device based on the received second identification of the BLE node and a known location of the BLE node.

10. A method for serially-connected Bluetooth Low Energy nodes, the method comprising:
    providing a cable including wires, and a plurality of Bluetooth Low Energy (BLE) nodes connected in series with the wires along a length of the cable; and
    continuously powering the plurality of nodes by a power source connected to the wires at one point along the cable so that each of the plurality of BLE nodes, when powered by the power source: (a) includes a transmit mode that transmits a first BLE beacon to a mobile device to locate the mobile device, and (b) when not in the transmit mode, functions in a receive mode by monitoring reception of a second BLE beacon from the mobile device, wherein, in the receive mode, a BLE node that received the second BLE beacon from the mobile device sends a report including a first identification of the mobile device and a second identification of the BLE node to a locationing server via a headend interface connected to the cable;
    determining a location, by the locationing server, of the mobile device based on the received second identification of the BLE node and a known location of the BLE node.

11. The method of claim 10, further comprising communicating with the plurality of nodes over the wires via the headend interface.

12. The method of claim 11, wherein communicating includes individually addressing and communicating with each node along two wires by digitally modulating signals at a frequency above baseband to allow the nodes to have simultaneous communicating and powering.

13. The method of claim 12, wherein communicating includes reconfiguring operating parameters of addressed nodes.

* * * * *

UNITED STATES PATENT AND TRADEMARK OFFICE
CERTIFICATE OF CORRECTION

PATENT NO. : 10,117,043 B2
APPLICATION NO. : 14/492148
DATED : October 30, 2018
INVENTOR(S) : Warner et al.

It is certified that error appears in the above-identified patent and that said Letters Patent is hereby corrected as shown below:

In the Claims

In Column 9, Line 28, in Claim 1, delete "device," and insert -- device to locate the mobile device, --, therefore.

Signed and Sealed this
Twelfth Day of September, 2023

Katherine Kelly Vidal
*Director of the United States Patent and Trademark Office*